United States Patent
Fahs, II

(10) Patent No.: US 11,217,805 B1
(45) Date of Patent: Jan. 4, 2022

(54) POINT OF USE HYDROGEN PRODUCTION UNIT

(71) Applicant: Richard W. Fahs, II, Woodstock, CT (US)

(72) Inventor: Richard W. Fahs, II, Woodstock, CT (US)

( * ) Notice: Subject to any disclaimer, the term of this patent is extended or adjusted under 35 U.S.C. 154(b) by 0 days.

(21) Appl. No.: 17/360,345

(22) Filed: Jun. 28, 2021

(51) Int. Cl.
*H01M 8/0656* (2016.01)
*C01B 3/06* (2006.01)
*H01M 8/22* (2006.01)
*H01M 8/04701* (2016.01)
*H01M 4/90* (2006.01)

(52) U.S. Cl.
CPC ............ *H01M 8/0656* (2013.01); *C01B 3/06* (2013.01); *H01M 4/9075* (2013.01); *H01M 8/04716* (2013.01); *H01M 8/22* (2013.01)

(58) Field of Classification Search
CPC ........ Y02E 60/36; C01B 3/042; B01J 35/004; B01J 19/127; B01J 2219/0892; C25B 1/55; H01M 8/0606; H01M 8/0656
See application file for complete search history.

(56) References Cited

U.S. PATENT DOCUMENTS

| | | | | |
|---|---|---|---|---|
| 2005/0260257 A1* | 11/2005 | Colic | ...................... | A61K 33/00 424/450 |
| 2006/0216193 A1* | 9/2006 | Johnson | ............... | A61N 5/0624 422/24 |
| 2010/0234835 A1* | 9/2010 | Horikawa | ............... | A61B 5/157 606/16 |
| 2012/0063967 A1* | 3/2012 | Tokuhiro | ............... | H01M 8/186 422/186 |
| 2012/0237842 A1* | 9/2012 | Suzuki | ................ | H01M 8/0656 429/423 |
| 2013/0105306 A1* | 5/2013 | Sonoda | .................... | C01B 3/042 204/242 |
| 2013/0316254 A1* | 11/2013 | Tokuhiro | ........... | H01M 8/04119 429/410 |
| 2014/0272623 A1* | 9/2014 | Jennings | ................ | B01J 19/127 429/411 |
| 2015/0214411 A1* | 7/2015 | Guerra | ...................... | C25B 1/55 136/257 |
| 2016/0032462 A1* | 2/2016 | Yamaguchi | ........... | C25B 11/075 204/252 |
| 2018/0345263 A1* | 12/2018 | Rozhkova | .............. | B01J 21/063 |
| 2020/0353403 A1* | 11/2020 | Al-Jodai | .................. | C01B 3/56 |

* cited by examiner

*Primary Examiner* — Imran Akram

(74) *Attorney, Agent, or Firm* — Richard A. Joel

(57) ABSTRACT

This invention relates to a point of use Hydrogen production unit for use with a Hydrogen fuel cell. The unit uses energy compression to produce a high energy pulse which reacts with the plasma of a gas filled flashlamp to produce a very high pulse of power which is discharged into the water via the surface of the flashlamp to activate the photocatalyst's surface and water interface to produce Hydrogen gas in a water tank or vessel having a gas filled flashlamp or a side emitting fiber optic array. The Hydrogen gas is fed to a storage container and thence to a fuel cell whom it is converted into power to drive vehicles, ships, airplanes, underwater vehicles, boats, etc.

9 Claims, 1 Drawing Sheet

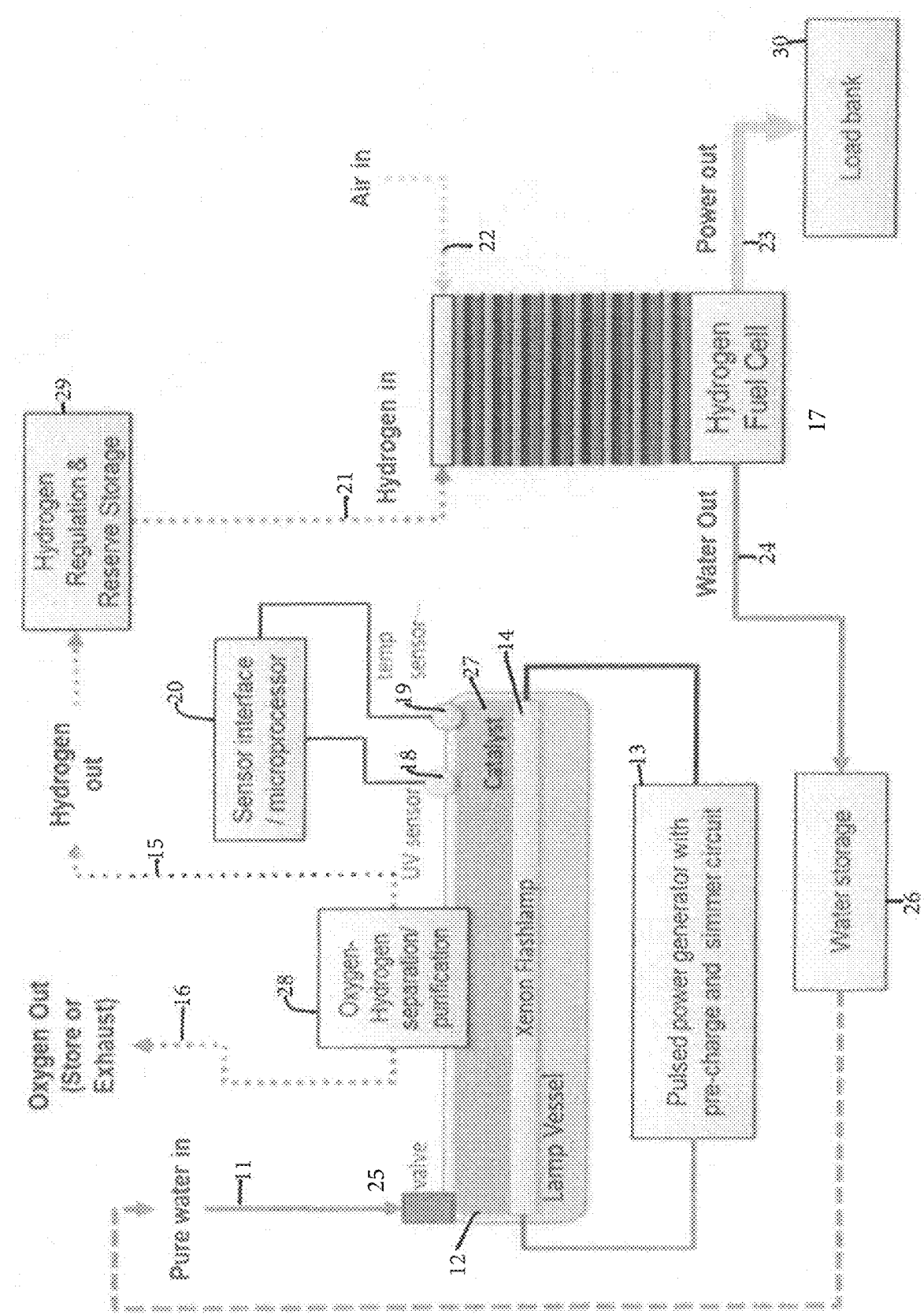

POINT OF USE HYDROGEN PRODUCTION UNIT

CROSS REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

DESCRIPTION

Field of the Invention

This invention relates to a stable point of use Hydrogen production unit particularly for use with a Hydrogen fuel cell.

Background of the Invention

This invention involves a unique method and apparatus for producing Hydrogen by using energy compression to produce the Hydrogen from water at the point of use.

Currently Hydrogen is not produced at the point of use since existing Hydrogen fuel systems use more energy to produce the Hydrogen than the Hydrogen itself can provide as a fuel. This defeats the purpose of using Hydrogen as a fuel.

With energy compression or use of a Marx or Fitch generator, or similar, a very small amount of energy can be compressed in a capacitor bank, where the capacitors are charged in parallel and then discharged in series to produce a very high energy pulse. This energy pulse is discharged into the flashlamp which excites the plasma within the flashlamp further creating a quantum leap of electrons which creates an extremely high pulse of power once the electrons return to the lower excited state of the plasma. This pulse of power is discharged from the surface of the flashlamp and will move through the water until it reaches the photocatalyst's surface. There it reacts with the surface of a photocatalyst and water producing magnitudes of Hydrogen in a water tank above the Hydrogen that is produced by the small amount of energy used as the input to the capacitor bank. This makes the use of Hydrogen in fuel cells commercially feasible. Nevertheless, the advantages of Hydrogen as a fuel over traditional (combustion) fuels are apparent such as fewer moving parts, cleaner exhaust and quiet operation. Existing technologies produce Hydrogen but require substantial additional equipment and complex storage arrangements. Point of use production of Hydrogen solves these problems.

The current Hydrogen production technologies use an amount of energy for water splitting which is higher in all cases than the energy produced by the Hydrogen. Even pulsed lamps use 6,000 to 10,000 volts to achieve their pulse. Water electrolysis is too inefficient, and a reformation process of cracking hydrocarbon requires too much energy.

There is no comparison to energy compression, large area photocatalyst, selective wavelengths, and high-power pulses from 1-100+Hz, all of which meet the first law of energy that is, energy, cannot be created or destroyed. Further, the operation can happen in a nanosecond or even quicker.

Prior Art

The prior art is quite active but not applicable and includes the following patents:

U.S. Pat. No. 10,947,115 discloses a process for the separation of Hydrogen and oxygen and particularly for purifying Hydrogen from a gas mixture containing Hydrogen and oxygen.

U.S. Pat. No. 10,998,562 relates to systems and devices for generating power using PEM fuel cell power systems compressing a rotary bed reactor for Hydrogen generation. Hydrogen is generated by the hydrolysis of fuels such as aluminum hydride.

U.S. Pat. No. 11,011,765 discloses a fuel cell-based power generator involving providing ambient air across a cathode side of the fuel cell element, receiving water from the fuel cell element and providing wet air to the water exchanger element. Cooling means are also provided.

Other patents of general interest include U.S. Pat. Nos. 10,946,964; 10,985,095; and 10,991,964.

The present invention is different from prior art technologies. In fact, all current approaches to using a Hydrogen fuel cell in automobiles or boats etc. use stored Hydrogen which must be refilled when it gets low. This is a gross inconvenience, but it is necessary since it takes more energy to produce the Hydrogen than the Hydrogen releases in energy. The thrust of this invention is that through energy compression or similar methods, one uses less energy to produce—the Hydrogen and it can be produced at point of use.

SUMMARY OF THE INVENTION

This invention relates to a method and apparatus for producing Hydrogen at point of use, for example, in fuel cells powering vehicles. An important aspect of the invention is to produce Hydrogen fuel which provides energy in quantities above the energy needed to produce the Hydrogen initially. The invention comprises a stand-alone, point of use, water splitting system sized to meet the Hydrogen fuel cell demands. The stand-alone system preferably with a backup of 2 or 3 units will supply the fuel cell with enough Hydrogen to meet the needs of the fuel cell. This is accomplished by means such as energy compression, pulse forming networks (PFN) or other specific means such as a Marx generator.

Specifically by taking a small amount of energy, say 1 volt from any available energy source such as wind, solar, mechanical, hydro, supercapacitors, etc. to charge a bank of capacitors in parallel and then discharging the capacitors in series produces a high energy burst. This energy is discharged into a preselected gas filled lamp with pressure and wavelengths set at a desired efficiency. This produces an extremely high and controllable pulse of power which interacts with a large surface area of a selected water splitting photocatalyst to produce a significant amount of Hydrogen which can be used by a Hydrogen fuel cell.

The Hydrogen can also be stored in a gel, micro sieve or similar safe Hydrogen storage system and supplied to the fuel cell as needed for propelling boats, vehicles (manned or unmanned), etc.

Accordingly, it is an object of this invention to provide a new and improved method and apparatus for producing point of use Hydrogen for use in a fuel cell.

Another object of this invention is to provide a unique method and apparatus to produce a large volume of Hydrogen energy from a smaller energy input to the process.

Another object of this invention is to provide a new and improved method of energy compression with a Marx generator or similar to produce point of use Hydrogen.

A further object of this invention is to provide a unique arrangement wherein capacitors are charged in parallel and then discharged in series to produce a very high energy pulse and in turn via the plasma within the flashlamp create a power pulse which reacts with a photocatalyst and water producing Hydrogen.

A more specific object of this invention is to provide a new and improved method and apparatus to produce point of use Hydrogen for a fuel cell particularly in vehicles, ships or boats by using banks of capacitors to provide an extremely high energy pulse and in turn a power pulse which reacts with a photocatalyst to produce magnitudes of Hydrogen making the fuel cell commercially viable for driving such vehicles.

BRIEF DESCRIPTION OF THE DRAWINGS

The above and other objects and advantages of this invention may be more clearly seen when viewed in conjunction with the accompanying drawing wherein:

FIG. 1 is a schematic drawing of the invention.

DETAILED DESCRIPTION OF THE INVENTION

Referring now to the drawing FIG. 1, high purity technical water 11 is supplied to a reaction chamber 12 from storage 26 through valve 25 *******). An apparatus 13 similar to a Marx generator pulses high energy pulses through a tunable and/or doped Xenon or gas mixtures/(gas filled) flashlamp 14 in vessel 12 targeting the 125 nm wavelength via a range of wavelengths with the 125 nm as the center of the range compensating for inhibitors such as cage effect. In proximity to the lamp 14, a semiconductor photocatalyst 27 surface provides the necessary election hole to facilitate the creation of Hydrogen ions and in turn Hydrogen gas in the presence of UV/visible registration. The formed Hydrogen and Oxygen gas bubbles are selectively separated in chamber 28. The high purity Hydrogen gas flows through outlet 15. The Oxygen is removed through outlet 16 and is either stored or exhausted to the atmosphere. Pulse frequency and water supply flow rates determine the overall quantity of Hydrogen production and can be tuned to the required system demands. The Hydrogen is fed to a Hydrogen storage and regulation tank 29. The Hydrogen is then passed through a commercially available PEM fuel cell (such as a 80 KW Toyota or similar) creating DC current. The only inputs to the system are purified water 1l and a power supply 13 for the energy compression capacitors feeding the UV/visible flashlamps. The concept is scalable to nearly any system demand via either larger reaction chambers or multiple, potentially redundant units or smaller units.

As shown in FIG. 1, The flashlamp vessel 12 also includes a UV/visible intensity pulse light sensor 18 and a temperature sensor 19 which are coupled to a sensor interface/microprocessor 20 to monitor and control the Hydrogen producing operation. The Hydrogen input 21 and an air input 22 are fed to the fuel cell 17 in FIG. 1. This produces a power output 23 to the load bank 30 while a water end product is supplied back to the water storage vessel through outlet 24.

Optimizing the light source 14 and photocatalyst surface area contact points 27, is one goal of this patent. The result can be accomplished in several ways. The light source 14 can be set at a fixed pulsed wavelength or wavelength range or ranges or by use of a tunable control. Pulsed flashlamps, pulsed lasers, pulsed LLED, and pulsed electromagnetic spectrum are options. This would include a multiphoton enhanced water splitting photocatalyst activation site and the use of 2 or more photons which combine their lesser energies to meet a much higher energy of dissociation. This can be realized through ultrafast pulses. For example, using extremely low energy photons in the IR and visible light wavelengths and combining their energies to meet the dissociation energy of water at 125 nm (extremely high energy).

As an additional energy conservation method the photocatalyst 27 can be positioned in relationship to the light source 14 to optimize the light to photocatalyst surface exposure. This can be accomplished by use of a CAD simulation software and in turn 3D print the photocatalyst (with or without a base) so the photocatalyst's surface area is optimized and so the 3-D photocatalyst can be inserted around the flashlamp in the water chamber. Furthermore, by use of ultra-fast pulses and pulse shaping, other liquids can be scavenged for their Hydrogen and the photocatalytic surface can be manipulated or changed to other photocatalysts for a more efficient reaction site for new Hydrogen rich liquid forms. One other arrangement to fully optimize the light to photocatalyst exposure area, would use a fiber optic cable which runs from a single to multiple pulsed laser or lasers (tunable) to a vessel 12 or vessels holding the water at which point side emitting photocatalytic surface coated fiber would fill the vessels along with the water and where the water splitting can take place via the activation of the photocatalyst from within the side emitting fiber optic cable and the Hydrogen collected.

To summarize, this invention is directed to a new and unique point of use Hydrogen generation method which makes the use of Hydrogen feasible as a fuel for automobiles, boats, planes, ships etc. The use of Hydrogen fuel cells provides an economical, non-polluting source of power which requires less input than electric power sources having batteries using rare earth components. It also has considerable advantages over conventional combustion engine technologies.

While the invention has been explained by a detailed description of certain specific embodiments, it is understood that various modifications and substitutions can be made in any of them within the scope of the appended Claims, which are intended also to include equivalents of such embodiments.

What is claimed is:

1. A point of use Hydrogen production unit for use with a Hydrogen fuel cell comprising:
   a flashlamp vessel comprising a flashlamp having electrodes mounted internally at both ends of the flashlamp vessel;
   means for supplying water to the flashlamp vessel;
   a Xenon or gas filled mixture or single gas under a selected pressure mounted within the flashlamp vessel containing water and a semiconductor photocatalyst 3D printed or manually mounted in proximity to the flashlamp;
   a capacitor bank connected to the flashlamp to generate high electrical potential energy pulses to the lamp to facilitate high power pulses to activate the photocatalyst for the creation of Hydrogen from the water, and means for feeding the Hydrogen from the photocatalyst's surface to the fuel cell.

2. A point of use Hydrogen production unit for use with a Hydrogen fuel cell in accordance with claim 1, further including:
   a UV/visible light pulse sensor coupled to the flashlamp vessel to monitor the intensity and wavelength range from pulsed UV/visible light from the flashlamp to verify the selective bond disassociation energy relevant to the target molecular bonds of the water to produce Hydrogen.

3. A point of use Hydrogen production unit for use with a Hydrogen fuel cell in accordance with claim 2, further including:
   a sensor interface and microprocessor unit; and,
   a temperature sensor and a UV/visible pulse light intensity and wavelength range sensor coupled to the lamp vessel and to the sensor interface and microprocessor unit to monitor the operation of the flashlamp.

4. A point of use Hydrogen production unit for use with a Hydrogen fuel cell in accordance with claim 1, wherein:
   The capacitor bank further comprises a Marx generator.

5. A point of use Hydrogen production unit for use with a Hydrogen fuel cell in accordance with claim 1, wherein:
   The capacitor bank further comprises a Fitch generator.

6. A point of use Hydrogen production unit for use with a Hydrogen fuel cell in accordance with claim 1, further comprising:
   a hydrogen storage and regulation tank connected to the flashlamp vessel and configured to collect and store the Hydrogen and Oxygen, provide the Hydrogen to the fuel cell, and feed the Oxygen to the fuel cell or atmosphere Oxygen.

7. A point of use Hydrogen production unit for use with a Hydrogen fuel cell in accordance with claim 1, wherein:
   the photocatalyst comprises a water splitting photocatalyst, a carbon based photocatalyst, a Graphene, or 2D photocatalyst covering a large surface area within the flashlamp water vessel.

8. A point of use Hydrogen production unit for use with a Hydrogen fuel cell in accordance with claim 1, wherein:
   the Xenon flashlamp comprises a tunable spectrum flashlamp targeting the 123 nm Spectrum range.

9. A point of use Hydrogen production unit for use with a Hydrogen fuel cell in accordance with claim 1, wherein:
   the flashlamp vessel includes an outlet configured to remove the oxygen produced within the flashlamp vessel.

* * * * *